United States Patent Office 3,366,714
Patented Jan. 30, 1968

3,366,714
CARBAMYL SUBSTITUTED POLYPHOSPHATES
Ivan C. Popoff, Ambler, Pa., assignor to Pennsalt Chemicals Corporation, Philadelphia, Pa., a corporation of Pennsylvania
No Drawing. Filed Aug. 18, 1964, Ser. No. 390,480
13 Claims. (Cl. 260—933)

ABSTRACT OF THE DISCLOSURE

Carbamyl substituted polyphosphates useful as pesticides have the structure

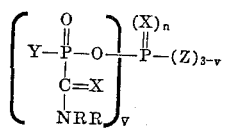

where X is sulfur or oxygen, $n$ is 0 or 1, R is alkyl, phenyl or substituted phenyl, $v$ is 1 or 2, Y is R, NRR or OR, and Z is R, NRR, OR or SR.

---

This invention relates to new carbamyl substituted polyphosphates and their sulfur analogs, and more specifically relates to compounds having the general formula:

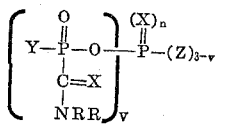

where X is selected from the group consisting of sulfur and oxygen atoms and where the X groups may be the same or different, $n$ is an integer selected from the group consisting of 0 and 1, R contains from 1 to 12 carbon atoms and is selected from the group consisting of alkyl, aryl, halogen substituted aryl, aryl substituted by $NO_2$, and alkyl substituted aryl, and where the R-groups may be the same or different, $v$ is an integer from 1 to 2, Y is selected from the group consisting of R, NRR groups, and OR groups in all of which the R groups may be the same or different, and Z is selected from the group consisting of Y and SR.

Especially preferred are those compounds of the present invention in which X is O and in which $v$ is one, and where the R groups have from 1 to 5 carbon atoms, and most preferred are such compounds in which Z is NRR or OR and Y is NRR or OR.

It has now been found that the compounds of the present invention exhibit valuable pesticidal properties including the ability to kill flies and mites and are also useful as antioxidants for gasoline and oils and as corrosion inhibitors.

The compounds of the present invention are made according to the following reaction:

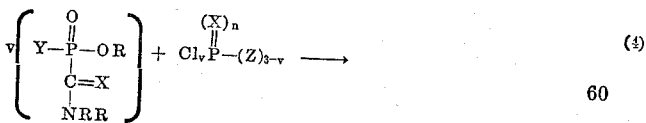

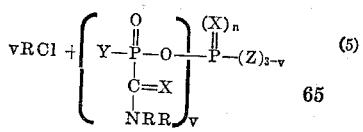

The reaction is carried out at a temperature of from about 100° to about 250° C. and preferably at from 150° to 220° C. The reaction time will be from 15 minutes to about 24 hours with reaction times in the range of 0.5 to 8 hours being preferred.

The reaction may be conducted on either a batch or a flow basis in conventional equipment such as a stirred reactor with reflux condenser.

The by-product alkyl chloride is preferably distilled off as the reaction proceeds and the residue will, in most cases, be found to be a viscous oil or paste which is soluble in water, and slightly soluble in organic solvents such as, for example, acetone.

Raw materials for the production of the compounds of the present invention can be conventionally prepared by methods disclosed in texts on organic phosphorus chemistry, particularly in G. M. Kosolapoff, Organophosphorus Compounds, John Wiley, N.Y. (1950), especially Chapters IV, VII and IX and the references noted therein.

The carbamylphosphonates are conventionally prepared by the Michaelis-Arbuzov or the Michaelis-Becker reaction as disclosed in Chapter VII of Kosolapoff mentioned above, and the references there noted. Preferred examples of the carbamylphosphonate raw materials are:

(1) Ethyl methyl N,N-diethylcarbamylphosphonate
(2) Ethyl methyl N,N-diethylthiocarbamylphosphonate
(3) Ethyl methyl N,N-dimethylthiocarbamylphosphonate
(4) Ethyl phenyl N-ethyl-N-methylcarbamylphosphonate
(5) Ethyl phenyl N-ethyl-N-methylthiocarbamylphosphonate
(6) Methyl phenyl N,N-dibutylcarbamylphosphonate
(7) p-Chlorophenyl methyl N,N-diethylcarbamylphosphonate
(8) Methyl N,N - dimethyl - P - (N,N - diethylcarbamyl) phosphonamidate
(9) Methyl N - ethyl - P - (N,N - diethylcarbamyl) phosphonamidate
(10) Ethyl p-methoxyphenyl N,N-diethylcarbamylphosphonate
(11) Ethyl p - nitrophenyl N,N - dibutylcarbamylphosphonate These compounds have the following respective structures:

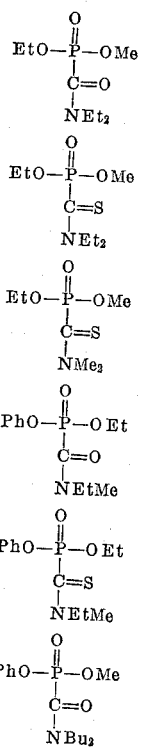

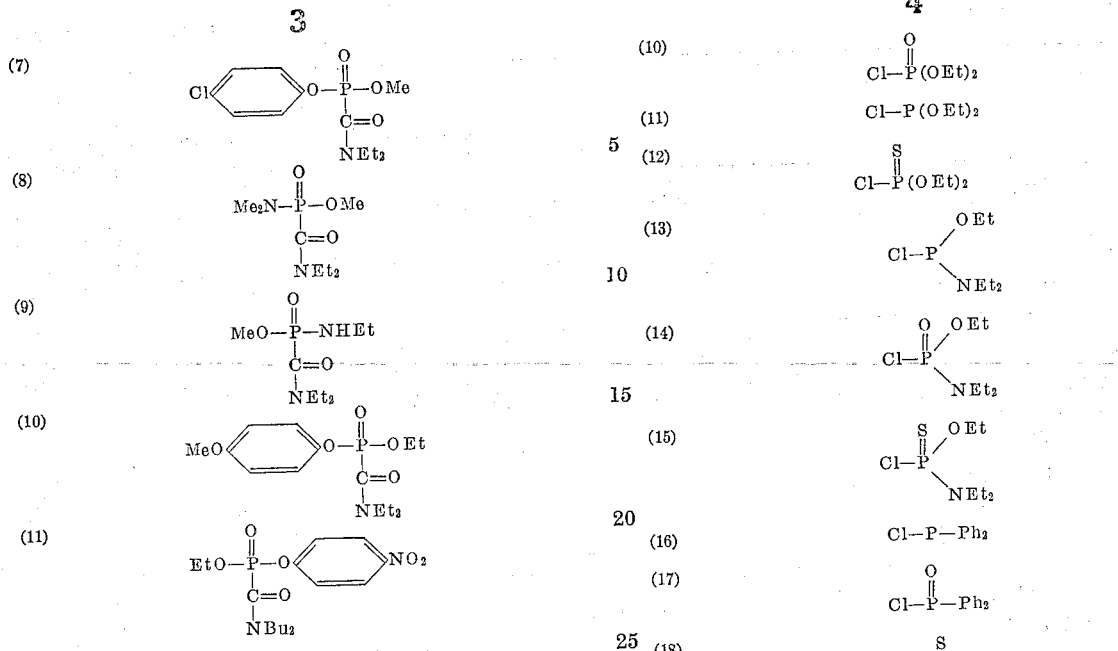

The P-Cl compounds used as starting materials for the present invention may be conventionally prepared according to the methods outlined in Chapters IV and IX of Kosolapoff. These P-Cl starting materials include the following preferred compounds:

(1) Phenylphosphonous dichloride
(2) Phenylphosphonic dichloride
(3) Phenylphosphonothioic dichloride
(4) N,N-diethylphosphoramidous dichloride
(5) N,N-diethylphosphoramidic dichloride
(6) N,N-diethylphosphoramidothioic dichloride
(7) N,N,N',N'-tetraethylphosphordiamidic chloride
(8) N,N,N',N'-tetraethylphosphordiamidous chloride
(9) N,N,N',N'-tetramethylphosphordiamidothioic chloride
(10) Diethyl phosphorochloridate
(11) Diethyl phosphorochloridite
(12) O,O-diethylphosphorothiochloridate
(13) Ethyl N,N-diethylphosphoramidous chloride
(14) Ethyl N,N-diethylphosphoramidic chloride
(15) Ethyl N,N-diethylphosphoramidothioic chloride
(16) Diphenylphosphinous chloride
(17) Diphenylphosphinic chloride
(18) Diphenylphosphinothioic chloride These compounds have the following respective structures:

P-Cl compounds

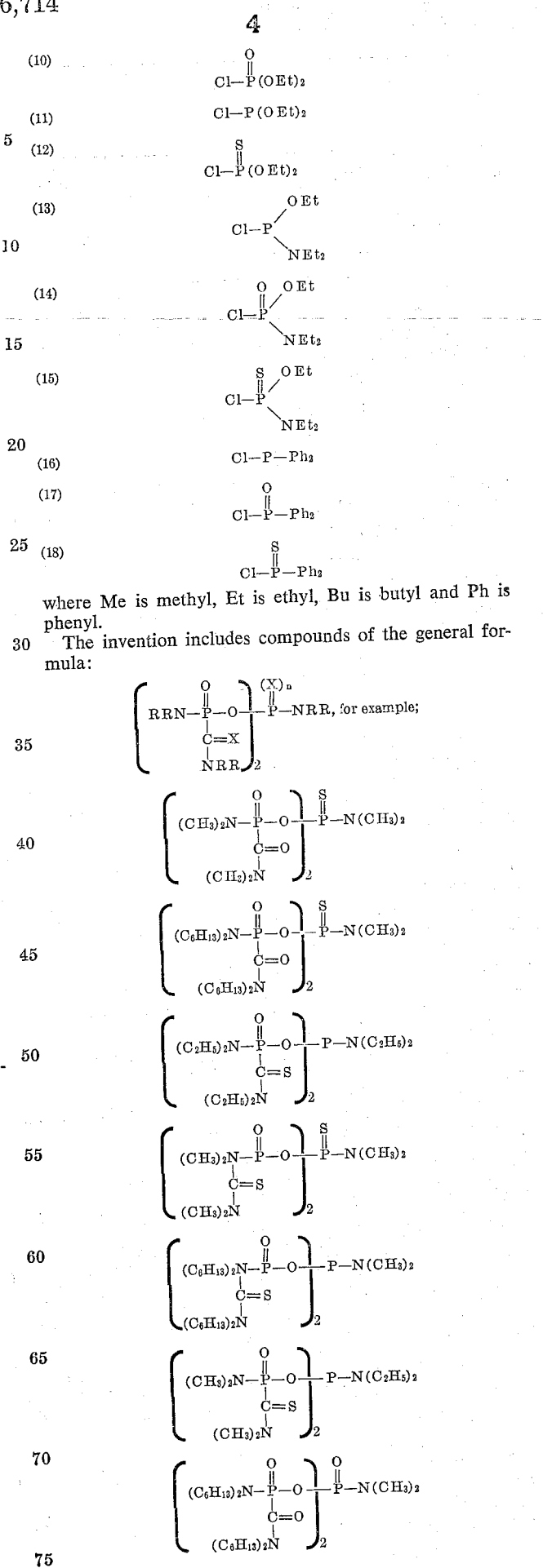

where Me is methyl, Et is ethyl, Bu is butyl and Ph is phenyl.

The invention includes compounds of the general formula:

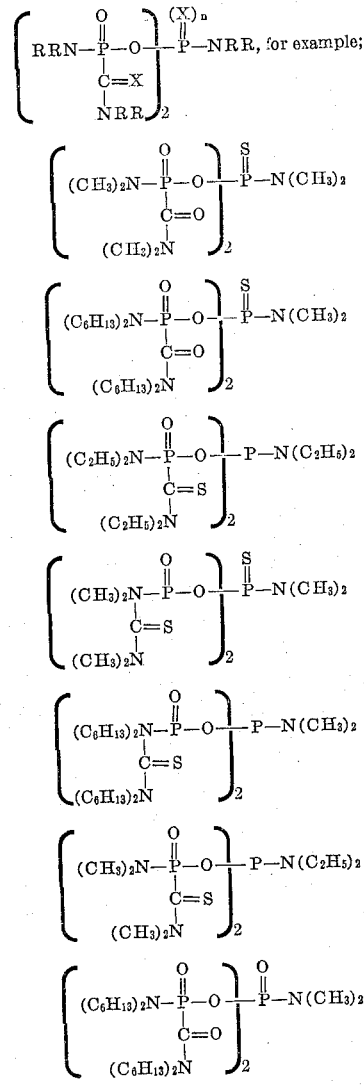

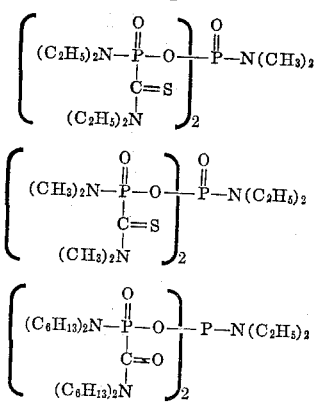
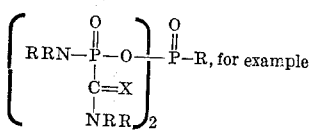
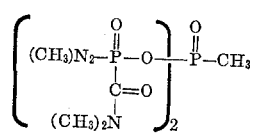
The invention also includes compounds of the general formula:
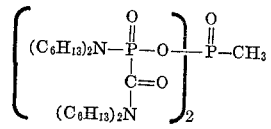
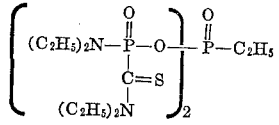
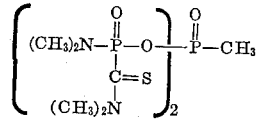
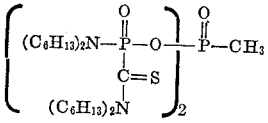
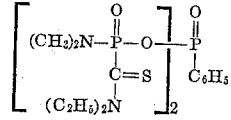
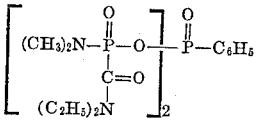
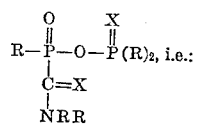
The present invention also includes compounds of the general formula:
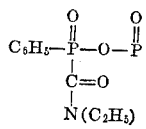
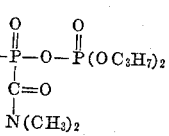
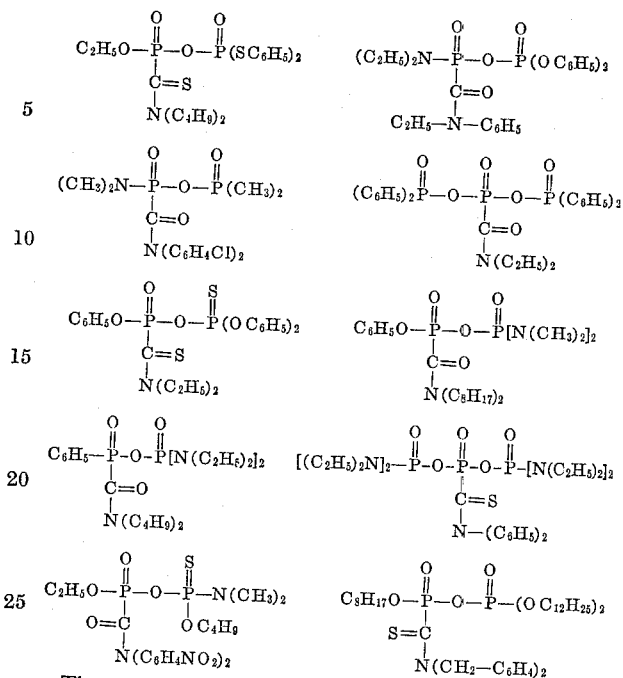
The present invention also includes compounds of the general formula:
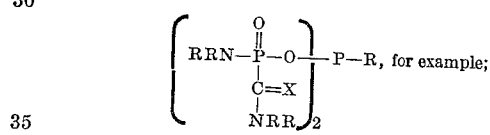
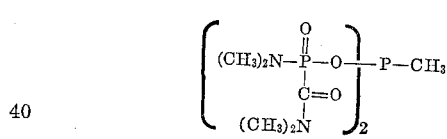
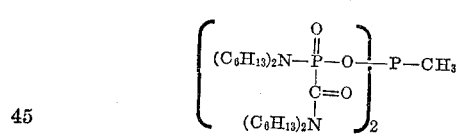
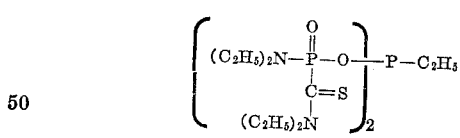
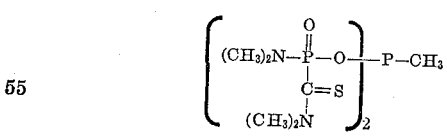
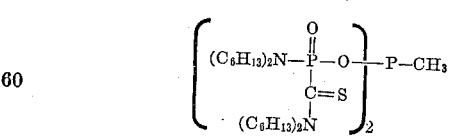
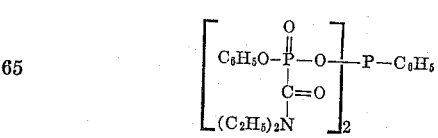
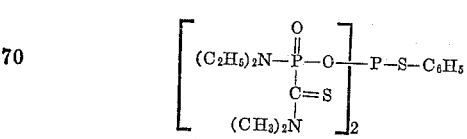
The compounds of the present invention can be employed as pesticides either directly, undiluted, or in a variety of compositions both liquid and solid including solutions, concentrates, emulsifiable concentrates, slurries, finely-divided powders, granular materials and pastes. The compounds may be employed either alone in compositions as the essential pesticidal ingredient or with other pesticides. Useful compositions can also include as other ingredients, diluents, extenders, fillers, conditioners and solvents. For example, compositions may include, in dust formulations, various clays, diatomaceous earth, talc, and powdered proteinaceous materials, such as powdered cereal wastes. Liquid compositions can include emulsions, suspensions or solutions in inert organic carriers such as acetone, kerosene, benzene, toluene, xylene, various naphthas, including e.g. Stoddard solvent, and other petroleum distillate fractions or mixtures thereof. It will frequently be found desirable to use wetting or emulsifying dispersing agents to facilitate useful formulation and for this purpose non-ionic surfactants will generally be preferred.

The compounds of this invention and formulations containing the compounds as essential pesticidal ingredients are preferably applied in liquid form, e.g. as an emulsion in water or a solution in a hydrocarbon oil. Such formulations will preferably contain at least about 0.005% and preferably from about 0.01% to about 15% of at least one of the compounds of the present invention. The formulations to be applied in dust form will preferably contain 0.005% or more and most preferably will contain from about 1% to about 20% of the compounds of the invention.

The compositions containing the compounds of the invention can be applied directly to the locus to be protected. For example, the area around and on economic plants already infested with insects or to plants on which infestation is to be prevented. The compositions may be used either in direct contact or as systemic pesticides.

In general, a quantity of at least about 0.1 pound of the new compounds per acre and preferably from about 1.0 to about 50 pounds per acre are used on plants. However, in specialized instances substantially larger amounts may be used.

The preparation of the compounds of the present invention is illustrated in Examples 1 to 7 which follow.

EXAMPLE 1

*Preparation of bis(ethoxy N,N-dimethylcarbamylphosphinyl)phenylphosphine*

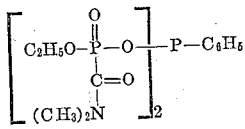

To 2.2 moles of diethyl N,N-dimethylcarbamylphosphonate is added 1.0 mole of phenylphosphonous dichloride slowly over a 45-minute period with stirring at a temperature of 190°–200° C. Stirring is continued for an additional 15 minutes at 185°–195° C. The ethyl chloride thus formed distills off during the reaction. The quantity of ethyl chloride collected is 94% of the theoretical amount. The residue is a paste, the crude bis(ethoxy N,N-dimethylcarbamylphosphinyl)phenylphosphine which is recovered. Infrared spectrum of the paste shows the following characteristic peaks:

| | |
|---|---|
| $\overset{O}{\underset{\|}{C}}$—N | About 6μ. |
| P—C$_6$H$_5$ | 6.94μ. |
| P=O | About 8.8μ. |
| P—O—C | About 9.6μ. |
| P—O—P | About 10.2μ. |

A 12.5 milligram per milliliter solution of the above compound in acetone is effective to kill two-spotted mites when used conventionally as a contact spray.

EXAMPLE 2

*Preparation of bis(ethoxy N,N-dimethylcarbamylphosphinyl) N,N-diethylphosphoramidite*

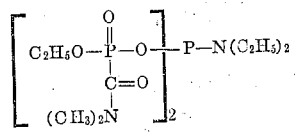

To 2 moles of diethyl-N,N-dimethylcarbamylphosphonate is added 1.0 mole N,N-diethylphosphoramidous dichloride slowly over a 15-minute period with stirring at a temperature of 160°–170° C. Stirring is continued for an additional 10 minutes at about 170° C. The ethyl chloride thus formed distills off during the reaction and the amount collected is found to be approximately 70% of the theoretical amount. The residue is a paste, found to be crude bis(ethoxy N,N-dimethylcarbamylphosphinyl) N,N-diethylphosphoramidite which is recovered. It is soluble in water and is slightly soluble in acetone. The infrared spectrum shows the following characteristic peaks:

| | |
|---|---|
| $\overset{O}{\underset{\|}{C}}$—N | 6.26μ. |
| P=O | 8.40μ. |
| P—O—C | 8.65μ, 9.55μ. |
| P—O—P | About 10.3μ. |

When the above compound is applied conventionally as a contact spray in a 3.125 milligram per ml. solution in acetone it is effective to kill house flies within 24 hours.

EXAMPLE 3

*Preparation of ethoxy-N,N-dimethylcarbamylphosphinyl tetraethylphosphorodiamidate*

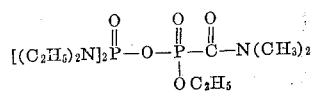

A mixture of 1.0 mole of tetraethylphosphorodiamidic chloride and 1.1 moles of diethyl N,N-dimethylcarbamylphosphonate is stirred for 40 minutes at 190–205° C. 83% of the theoretical amount of ethyl chloride is collected. The residue, an oil, is the crude ethoxy-N,N-dimethylcarbamylphosphinyl tetraethylphosphorodiamidate having the following infrared spectra:

| | |
|---|---|
| $\overset{O}{\underset{\|}{C}}$—N | 6.15μ. |
| P=O | 8.01μ (shoulders 7.88μ, 7.78μ). |
| P—O—C | 9.72μ. |
| P—O—P | 10.4μ. |

When a 0.0625% by weight emulsion of the above compound is prepared in acetone and used conventionally as a contact spray against two-spotted mites, 83% of the mites are killed within 24 hours.

EXAMPLE 4

*Preparation of ethoxy-N,N-dimethylcarbamylphosphinyl tetramethylphosphorodiamidothionate*

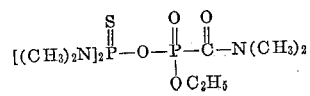

A mixture of 1.0 mole of tetramethylphosphorodiamidothioic chloride and 1.1 moles of diethyl N,N-dimethylcarbamylphosphonate is stirred for 30 minutes at 170–185° C. while 89% of the theoretical amount of ethyl chloride is collected. The residue, an oil, is the crude ethoxy - N,N - dimethylcarbamylphosphinyl tetramethylphosphorodiamidothionate having the following infrared spectra:

| | |
|---|---|
| O‖C—N | 5.87μ, 6.16μ. |
| P=O | 7.88μ, 7.61μ, 8.12μ. |
| P—O—C }[1] | |
| P—O—P } | 10μ. |
| P=S | 12.8μ. |

[1] Overlapping.

When a 12.5 milligram per milliliter emulsion of the above compound in acetone is used conventionally as a contact spray against house flies, it kills 74% of the flies within 24 hours. A 0.0625% by weight emulsion in acetone is similarly effective against two-spotted mites when similarly applied.

EXAMPLE 5

Preparation of diethoxyphosphinyl ethyl N,N-dimethylcarbamylphosphonate

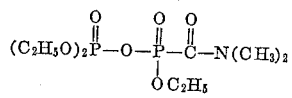

A mixture of 1.0 mole of diethylphosphorochloridate and 1.1 moles of diethyl N,N-dimethylcarbamylphosphonate is stirred for 15 minutes at 190–200° C. while 82% of the theoretical amount of ethyl chloride is collected. The residue, an oil, is the crude diethoxyphosphinyl ethyl N,N-dimethylcarbamylphosphonate having the following infrared spectra:

| | |
|---|---|
| O‖C—N | 6.12μ. |
| P=O | 7.75μ, 7.64μ, 7.96μ. |
| P—O—C | 9.72μ. |
| P—O—P | 10.2–10.7μ. |

When the above compound is prepared in a 0.0625% solution in acetone and used conventionally as a contact spray against two-spotted mites, it is effective to kill mites within 24 hours.

EXAMPLE 6

Preparation of diethoxyphosphinyl ethyl N,N-diethylcarbamylphosphonate

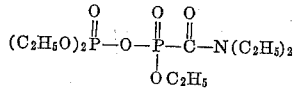

A mixture of 1.0 mole of diethylphosphorochloridate and 1.1 moles of diethyl N,N-diethylcarbamylphosphonate is stirred for 15 minutes at 190–200° C. while 82% of the theoretical amount of ethyl chloride is collected. The residue, an oil, is the crude diethoxyphosphinyl ethyl N,N-diethylcarbamylphosphonate having the following infrared spectra:

| | |
|---|---|
| O‖P—N | 6.17μ. |
| P=O | 8.14μ, 7.81μ. |
| P—O—C | 9.70μ. |
| P—O—P | 10.2μ. |

EXAMPLE 7

Preparation of ethoxy-N,N-diethylcarbamylphosphinyl diethyl phosphorothionate

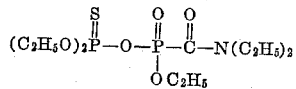

A mixture of 1 mole of diethyl phosphorchloridothionate and 1 mole of diethyl N,N-diethylcarbamylphosphonate is stirred for 15 minutes at 195–205° C. while 90% of the theoretical amount of ethyl chloride is collected. The residue, an oil, is the crude ethoxy-N,N-diethylcarbamylphosphinyl diethyl phosphorothionate having the following infrared spectra:

| | |
|---|---|
| O‖C—N | 5.99μ, 6.20μ. |
| P=O | 7.69μ. |
| P—O—C | 9.79μ. |
| P—O—P | 10.1μ. |
| P=S | 12.55μ. |

A 0.0625% by weight solution of the above compound in acetone is effective as a pesticide against two-spotted mites.

It should be understood that the foregoing examples and descriptions are intended to be illustrative of the invention and are not to be taken to limit it in any manner or to any degree.

What is claimed is:

1. A compound having the structure

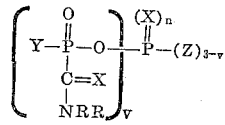

where X is selected from the group consisting of sulfur and oxygen atoms and where the X groups may be the same or different, n is an integer selected from the group consisting of 0 and 1, R contains from 1 to 12 carbon atoms and is selected from the group consisting of alkyl, phenyl, chlorine substituted phenyl, nitro substituted phenyl, and alkyl phenyl, and where the R groups may be the same or different, v is an integer from 1 to 2, Y is selected from the group consisting of R, NRR groups and OR groups in all of which R is defined above and may be the same or different, and Z is selected from the group consisting of R, NRR, OR and SR.

2. A compound in accordance with claim 1 wherein Y is NRR and Z is NRR.

3. A compound in accordance with claim 1 wherein Y is R and Z is R.

4. A compound in accordance with claim 1 wherein Y is OR and Z is R.

5. A compound in accordance with claim 1 wherein Y is R and Z is SR.

6. A compound in accordance with claim 1 wherein Y is OR and Z is OR.

7. Bis(ethoxy N,N-dimethylcarbamylphosphinyl)phenyl phosphine.

8. Bis(ethoxy N,N-dimethylcarbamylphosphinyl)-N,N-diethylphosphoramidite.

9. Ethoxy-N,N-dimethylcarbamylphosphinyl tetraethylphosphorodiamidate.

10. Ethoxy - N,N - dimethylcarbamylphosphinyl tetramethylphosphorodiamidothionate.

11. Diethoxyphosphinyl ethyl N,N - dimethylcarbamylphosphonate.

12. Diethoxyphosphinyl ethyl N,N - diethylcarbamylphosphonate.

13. Ethoxy - N,N - diethylcarbamylphosphinyl diethyl phosphorothionate.

References Cited

UNITED STATES PATENTS 2,668,837  2/1954  Tolkmith _____ 260—933
3,095,438  6/1963  Kauer _____ 260—933

CHARLES B. PARKER, Primary Examiner.

B. BILLIAN, A. H. SUTTO, Assistant Examiners.

UNITED STATES PATENT OFFICE
CERTIFICATE OF CORRECTION

Patent No. 3,366,714                                    January 30, 1968

Ivan C. Popoff

It is hereby certified that error appears in the above numbered patent requiring correction and that the said Letters Patent should read as corrected below.

Column 3, lines 73 to 75, for

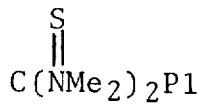      read      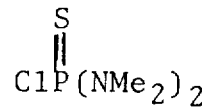

column 4, lines 55 to 59, the formula should appear as shown below instead of as in the patent:

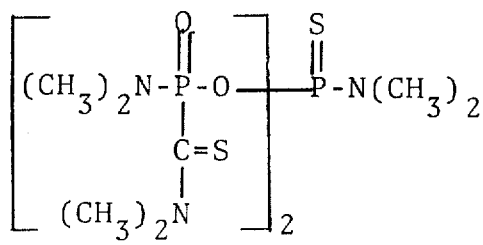

lines 60 to 65, the formula should appear as shown below instead instead of as in the patent:

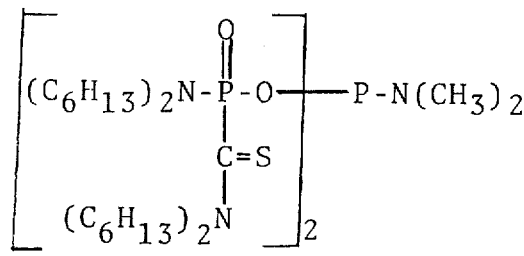

column 5, lines 25 to 30, the formula should appear as shown below instead of as in the patent:

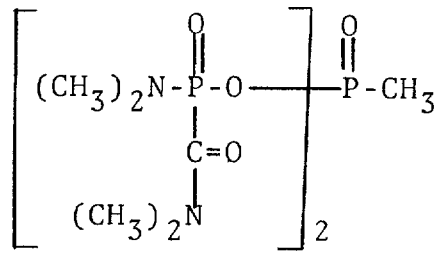

Signed and sealed this 1st day of April 1969.

(SEAL)
Attest:

EDWARD M. FLETCHER, JR.
Attesting Officer

EDWARD J. BRENNER
Commissioner of Patents